United States Patent [19]
Shin

[11] Patent Number: 5,119,245
[45] Date of Patent: Jun. 2, 1992

[54] ROTATIONAL PHASE DETECTING APPARATUS FOR HEAD DRUM UTILIZING VIDEO HEADS

[75] Inventor: Yong H. Shin, Suwon, Rep. of Korea

[73] Assignee: Goldstar Co., Ltd., Seoul, Rep. of Korea

[21] Appl. No.: 412,842

[22] Filed: Sep. 26, 1989

[30] Foreign Application Priority Data

Sep. 29, 1988 [KR] Rep. of Korea ............ 15938/1988

[51] Int. Cl.$^5$ ................ G11B 15/14; G11B 21/02
[52] U.S. Cl. ........................ 360/64; 360/70; 360/75
[58] Field of Search ............ 360/64, 70, 75, 109

[56] References Cited

U.S. PATENT DOCUMENTS

| | | | |
|---|---|---|---|
| 4,318,142 | 3/1982 | Ravizza | 360/77 |
| 4,930,025 | 5/1990 | Oberjatzas et al. | 360/64 |

Primary Examiner—A. J. Heinz
Assistant Examiner—Jefferson Evans
Attorney, Agent, or Firm—Rosen, Dainow & Jacobs

[57] ABSTRACT

A rotational phase detecting apparatus for a head drum utilizing a video head capable of directly detecting the rotational phase of the head drum for the reproducing signal of the video head without using an additional pulse generating head by disposing a permanent magnet facing the rotational direction of video heads. When video heads pass by the permanent magnet, positive pulses are generated from the video heads and the positive pulse signal of the first video head is applied to a phase detecting signal processing unit via a rotary transformer and the positive pulse signal of the second video head is converted into a negative pulse signal at the rotary transformer and applied to a phase detecting signal processing unit.

7 Claims, 2 Drawing Sheets

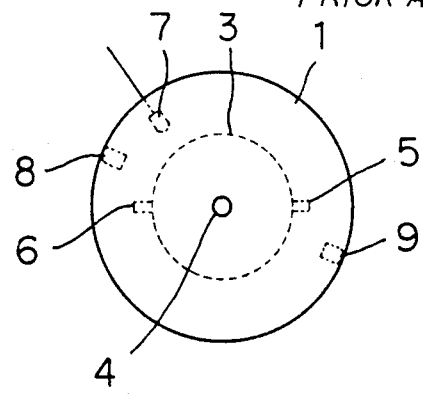
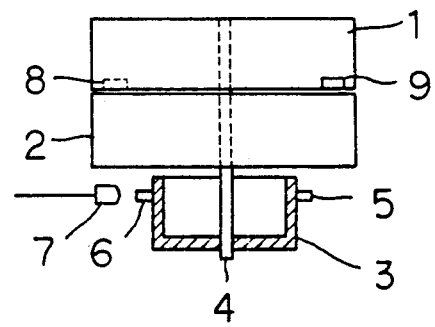
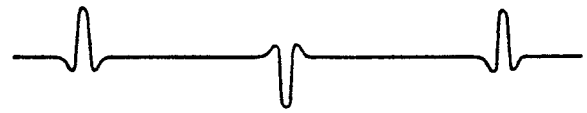
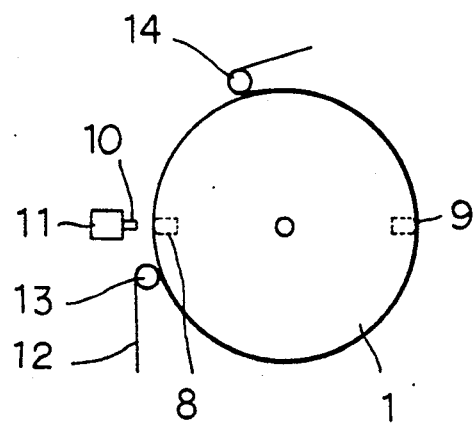
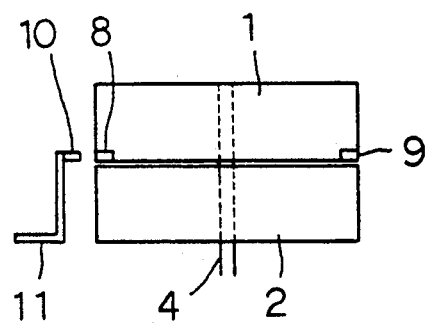

ROTATIONAL PHASE DETECTING APPARATUS FOR HEAD DRUM UTILIZING VIDEO HEADS

BACKGROUND OF THE INVENTION

The present invention relates to a rotational phase detecting apparatus for a head drum of a video tape cassette recorder, and more particularly to a rotational phase detecting apparatus for a head drum utilizing a video head which can directly detect the rotational phase of a head drum from a reproducing signal of a video head without using a separate pulse generating head.

In general, in order to produce a head switching signal in a video tape cassette recorder, it has been designed to detect the rotational phase of a head drum.

In a conventional head drum assembly as shown in FIGS. 1A and 1B, there are provided an upper drum 1 provided with first and second video heads 8 and 9, a lower drum 2, a rotor 3 of a drum motor, a rotary shaft 4 fixed to the rotor 3, the upper drum 1 being mounted to the rotary shaft 4, a pair of pulse generating magnets 5 and 6 which are oppositely mounted on the outer peripheral surface of the rotor 3, and a pulse generating head 7 disposed to face the rotational direction of the pulse generating magnets 5 and 6.

By these arrangements, when the pulse generating magnets 5 and 6 pass by the pulse generating head 7 as the rotor 3 of the drum motor rotates, the pulse generating head 7 generates a pulse signal as shown in FIG. 2 and the pulse signal is output as a rotational phase detecting signal for the head drum. That is to say, when the pulse generating magnet 6 reaches the pulse generating head 7, a positive pulse signal is generated from the pulse generating head 7. When the other pulse generating magnet 5 reaches the pulse generating head 7, a negative pulse signal is generated from the pulse generating head 7, and the pulse signal generated from the pulse generating head 7 is applied as a rotational phase detecting signal.

However, in such a conventional apparatus, an angular error may occur when fixing the pulse generating magnets to the rotor of the drum motor, and also an angular error may occur when connecting the rotor to the upper drum by the shaft. Therefore there have been some difficulties in producing the head switching signal from the rotational phase detecting signal for the head drum.

SUMMARY OF THE INVENTION

It is therefore an object of the present invention to provide a rotational phase detecting apparatus for a head drum in which it is possible to directly detect the rotational phase of the head drum from the reproducing signal of the video head without using a separate pulse generating head.

The above object of the present invention is attained in that a permanent magnet is disposed facing the rotational direction of the first and second video heads provided in the upper drum so that positive pulse signals are generated from the first and second video heads every time the first and second video heads pass by the permanent magnet, and the positive pulse signal generated from the first video head is applied to a phase detecting signal processing unit via a first rotary transformer and a first pre-amplifier, at the same time the positive pulse signal generated from the second video head is converted into a negative pulse signal at the second rotary transformer and applied to the phase detecting signal processing unit via a second pre-amplifier.

BRIEF DESCRIPTION OF THE DRAWINGS

The above and other objects, features and advantages of the present invention will become more apparent from the following detailed description taken in conjunction with the accompanying drawings, in which:

FIG. 1A and FIG. 1B are a plan view and a partial sectional view illustrating a conventional head drum assembly;

FIG. 2 is a wave form chart of the phase detecting signal of FIG. 1;

FIG. 3A and FIG. 3B are a plan view and a partial sectional view illustrating a head drum assembly of the present invention.

DETAILED DESCRIPTION OF THE INVENTION

Figure 4:
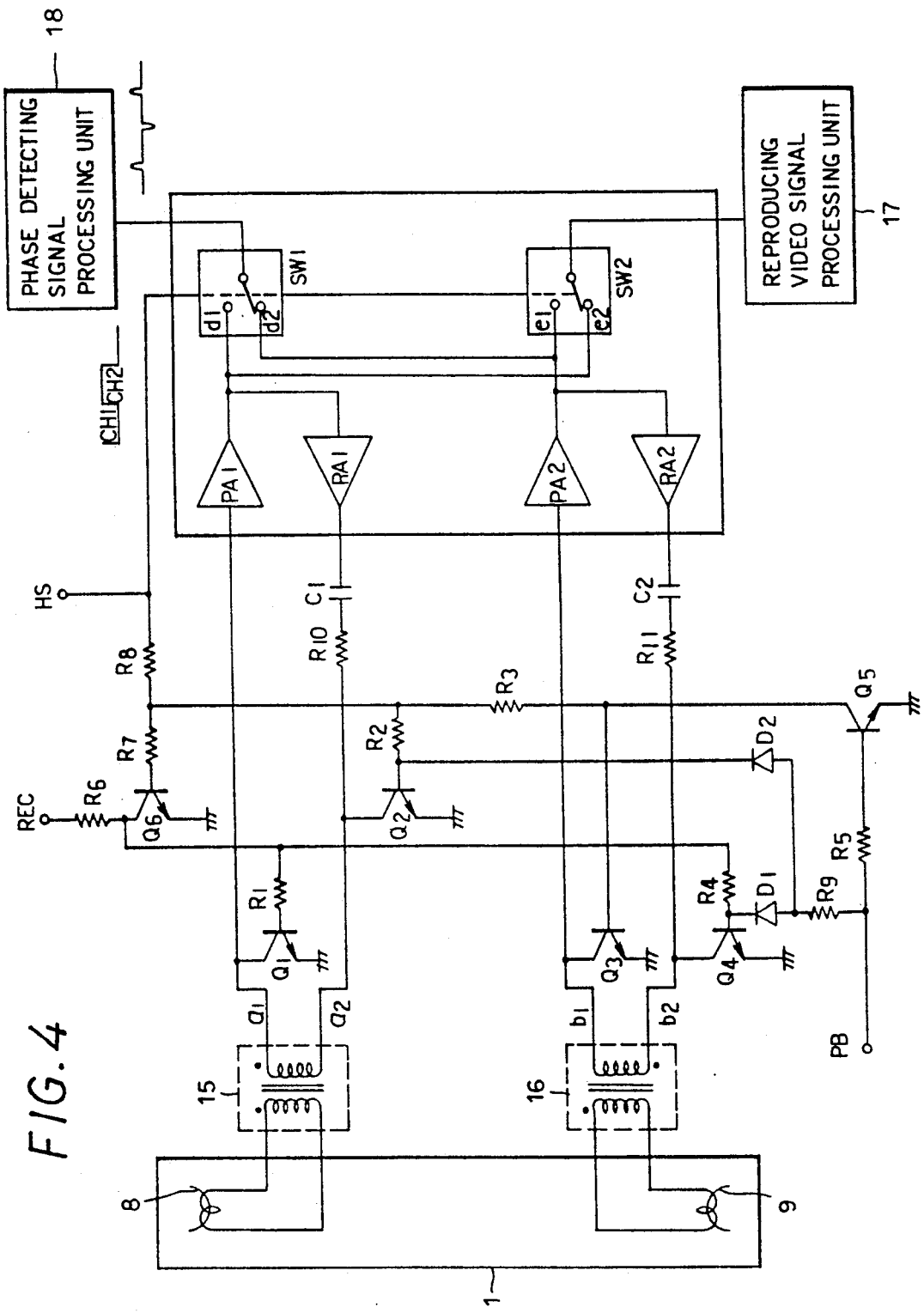
FIG. 4 is a circuit diagram of a rotational phase detecting apparatus for a head drum according to the present invention.

Referring to FIGS. 3A and 3B, a bracket 11 is mounted adjacent to an inlet side guide post 13, about which a tape 12 is wrapped, and at the upper end of the bracket 11 a permanent magnet 10 is mounted so as to face the first and second video heads 8 and 9 provided at the upper drum 1 so that every time the first and second video heads 8 and 9 pass by the permanent magnet 10, positive pulse signals are generated from the first and second video heads 8 and 9. Reference numeral 14 is an outlet side guide post for the tape 12 after it leaves the drum.

Referring to FIG. 4, there is shown a circuit diagram of the rotational phase detecting apparatus for a head drum according to the present invention. As shown in FIG. 4, the rotational phase detecting apparatus is constituted in a manner that the first and second video heads 8 and 9 of the upper drum 1 are connected to primary windings of rotary transformers 15 and 16 so that opposite polarity signals are output from secondary windings of the rotary transformers 15 and 16; terminals $a_1$ and $b_1$ at one end of secondary windings of the rotary transformers 15 and 16 are connected via pre-amplifiers $PA_1$ and $PA_2$, respectively, in common to fixed terminal $d_1$ of a first switch $SW_1$ and fixed terminal $e_2$ of a second switch $SW_2$ as well as to fixed terminal $d_2$ of the first switch $SW_1$ and one side fixed terminal $e_2$ of the second switch $SW_2$, respectively; movable arm terminals of the first and second switches $SW_1$ and $SW_2$ are connected to a phase detecting signal processing unit 18 and reproducing video signal processing unit 17, respectively; output terminals of the preamplifiers $PA_1$ and $PA_2$ are connected, respectively, to terminals $a_2$ and $b_2$ at the other end of secondary windings of the rotary transformers 15 and 16 via recording amplifiers $RA_1$ and $RA_2$, capacitors $C_1$ and $C_2$ and resistors $R_{10}$ and $R_{11}$, respectively; a head switching signal terminal HS is connected to a control terminal of the first and second switches $SW_1$ and $SW_2$ and to bases of transistors $Q_6$, $Q_2$ and $Q_3$ via resistors $R_8$, $R_7$, $R_2$, and $R_3$; the base of the transistor $Q_3$ is connected to the collector of a transistor $Q_5$; recording signal terminal REC is connected to the collector of the transistor $Q_6$ via resistor $R_6$ and to bases of transistors $Q_1$ and $Q_4$ via resistors $R_1$ and $R_4$, respectively; reproducing signal terminal PB is connected to the base of the transistor $Q_5$ via the resistor $R_5$ and to bases of transistors $Q_4$ and $Q_2$ via resistor $R_9$, and diodes $D_1$ and $D_2$, respectively; and collectors of transistors $Q_1$, $Q_2$, $Q_3$ and $Q_4$ are connected, respectively, to terminals $a_1$, $a_2$, $b_1$ and $b_2$ of rotary transformers 15 and 16. In the above, a high potential signal is applied to the recording signal terminal REC at the time of recording, and a high potential signal is applied to the reproducing signal terminal PB at the time of reproducing. Switches $SW_1$ and $SW_2$ are constituted such that when a high potential switching signal is applied thereto they are short-circuited to their fixed terminals $d_1$ and $e_1$; alternatively when a low potential switching signal is applied thereto they are short-circuited to their fixed terminals $d_2$ and $e_2$, respectively.

Hereinafter, the operation and effect of the invention will now be described in detail.

When the first and second video heads 8 and 9 are rotated as the upper drum 1 rotates, positive pulse signals are output from the first and second video heads 8 and 9 every time the first and second video heads 8 and 9 pass by the permanent magnet 10.

At this moment, if the VCR is in the reproducing state, a high potential signal is applied to reproducing signal terminal PB, and a low potential signal is applied to recording signal terminal REC. Accordingly, since the high potential signal of the reproducing signal terminal PB makes the transistor $Q_5$ conductive, a low potential signal is output from the collector of the transistor $Q_5$ to turn the transistor $Q_3$ off. The high potential signal of the reproducing signal terminal PB is passed through the resistor $R_9$ and diodes $D_1$ and $D_2$, making transistors $Q_4$ and $Q_2$ conductive, thereby terminals $a_2$ and $b_2$ of the secondary windings of the rotary transformers 15 and 16 assume ground potential. At this time the transistor $Q_1$ turns off by the low potential signal of the recording signal terminal REC. Accordingly, video signals reproduced at the first and second video heads 8 and 9 are output from terminals $a_1$ and $b_1$ of the secondary windings of the rotary transformers 15 and 16.

On the other hand, when the head switching signal of the head switching signal terminal HS becomes a high potential signal and the second video head 9 scans the video tape 12, the first and second switches $SW_1$ and $SW_2$ are short-circuited or connected to their fixed terminals $d_1$ and $e_1$ by the high potential head switching signal. Accordingly, a video signal reproduced at the second video head 9 is applied to the reproducing video signal processing unit 17 via the second rotary transformer 16, second pre-amplifier $PA_2$ and second switch $SW_2$. When the first video head 8 passes by the permanent magnet 10 the positive pulse generated from the first video head 8 is applied to the phase detecting signal processing unit 18 via the first rotary transformer 15, first pre-amplifier $PA_1$ and first switch $SW_1$.

Thereafter, when the head switching signal of the head switching signal terminal HS becomes a low potential signal and the first video head 8 scans the video tape, the first and second switches $SW_1$ and $SW_2$ are short-circuited or connected to their fixed terminals $d_2$ and $e_2$ by the low potential head switching signal. Accordingly, a video signal reproduced at the first video head 8 is applied to the reproducing video signal processing unit 17 via the first rotary transformer 15, second pre-amplifier $PA_2$ and second switch $SW_2$, and when the second video head 9 passes by the permanent magnet 10 the positive pulse generated from the second video 8 turns into a negative pulse at the second rotary transformer 16 and is then applied to the phase detecting signal processing unit 18 via the second pre-amplifier $PA_2$ and first switch $SW_1$.

On the other hand, when placed in a recording state a high potential is applied to the recording signal terminal REC, a low potential signal is applied to the reproducing signal terminal PB, and the transistor $Q_5$ turns off by the low potential signal of the reproducing signal terminal PB. Accordingly, when the head switching signal of the head switching signal terminal HS becomes a high potential signal and the second video head 9 scans the video tape 12, the first and second switches $SW_1$ and $SW_2$ are short-circuited or connected to their fixed terminals $d_1$ and $e_1$ by the high potential head switching signal. At this time transistors $Q_2$ and $Q_3$ become conductive by the high potential head switching signal so that low potential is applied to the terminal $a_2$ of the secondary winding of the first rotary transformer 15 and one side terminal $b_1$ of secondary winding of the second rotary transformer 16, and since the transistor $Q_6$ becomes conductive by the high potential switching signal and a low potential signal is output from the collector of the transistor $Q_6$, transistors $Q_1$ and $Q_4$ are turned off.

Accordingly, the output signal of the second recording amplifier $RA_2$ is applied to the second video head 9 so as to be recorded in the video tape 12 while flowing through the capacitor $C_2$, resistor $R_{11}$ and the secondary winding of the second rotary transformer 16. The positive pulse generated when the first video head 8 passes by the permanent magnet 10 is applied to the phase detecting signal processing unit 18 via the first rotary transformer 15, first pre-amplifier $PA_1$ and first switch $SW_1$.

Thereafter, when the head switching signal of the head switching signal terminal HS becomes a low potential signal and the first video head 8 scans the video tape 12, the first and second switches $SW_1$ and $SW_2$ are short-circuited or connected to their fixed terminals $d_2$ and $e_2$ by the low potential head switching signal. Transistors $Q_2$, $Q_3$ and $Q_6$ are turned off by the low potential head switching signal and thus a high potential signal is output from the collector of the transistor to make transistors $Q_1$ and $Q_4$ conductive. Accordingly, the output signal the first recording amplifier $RA_1$ is applied to the first video head 8 so as to be recorded in the video tape 12 while flowing through the capacitor $C_1$, resistor $R_{10}$ and the second winding of the first rotary transformer 15. The positive pulse generated when the second video head 9 passes by the permanent magnet 10 is turned into a negative pulse and then applied to the phase detecting signal processing unit 18 via the second pre-amplifier $PA_2$ and first switch $SW_1$.

As described above in detail, the present invention has the advantage that since the rotational phase detecting signal for the head drum can be directly attained from the reproducing signal of the video head without using separate pulse generating head, it is easy to produce the head switching signal and it becomes possible to make the construction simpler.

What is claimed is:

1. A rotational phase detecting apparatus for a head drum utilizing a video head comprising:
   first and second video heads mounted on an upper drum;
   a permanent magnet facing the first and second video heads so that the first and second video heads output positive pulses when rotated past the magnet;

a first rotary transformer connected to the first video head to generate signals of a first polarity;

a second rotary transformer connected to the second video head to generate signals of a second polarity opposite the first polarity;

first and second pre-amplifiers connected to amplify the signals being output from terminals at first ends of the secondary windings of the first and second rotary transformers;

first and second switches connected to select output signals of the first and second pre-amplifiers, respectively, and to apply the selected signals to a phase detecting signal processing unit and a reproducing video signal processing unit;

first and second recording amplifiers connected to apply recording signals to terminals at second ends of the secondary windings of the first and second rotary transformers opposite said first ends via first and second capacitors and first and second resistors, respectively;

a first transistor connected to be turned on/off depending upon the potential of a head switching signal in a recording state;

a second transistor connected to ground the first terminal of the secondary winding of the first rotary transformer when the first transistor is turned off;

a third transistor connected to ground the second terminal of the secondary winding of the second rotary transformer when the first transistor is turned off when the apparatus is in the recording state or in a reproducing state;

a fourth transistor connected to ground the second terminal of the secondary winding of the first rotary transformer when the head switching signal is in a high potential state or the apparatus is in the reproducing state; and a fifth transistor connected to normally maintain a sixth transistor in an off-state and to ground the second terminal of the secondary winding of the second rotary transformer when the head switching signal is in the high potential state.

2. In a video cassette recorder having first and second video heads, a head switching signal source, phase signal processing means, video signal processing means, and recording and reproducing operational modes, the improvement comprising:

means for producing a static magnetic field for causing the first and second video heads to generate phase signals of opposite polarity when rotating past a fixed point and also to generate video signals when in the reproducing mode and to record video signals when in the recording mode, circuit means connecting the video heads to the phase signal processing means and the video signal processing means for selectively connecting generated video signals from the video heads to the video signal processing means and generated phase signals from the video heads to the phase signal processing means, thereby eliminating the need for separate phase signal generating heads.

3. The apparatus of claim 2, wherein the selectively connecting means is connected to operate in response to a head switching signal.

4. The apparatus of claim 2, wherein, when in the reproducing mode, in response to one head switching signal, the circuit means comprises means for connecting the first video head output to the video signal processing means while substantially simultaneously connecting the second video head output to the phase signal processing means.

5. The apparatus of claim 4, wherein in response to another head switching signal, the circuit comprises means for connecting the first video head output to the phase signal processing means while substantially simultaneously connecting the second video head output to the video signal processing means.

6. The apparatus of claim 2, wherein, when in the recording mode, in response to one head switching signal, a video signal is inputted to the first video head while substantially simultaneously the second video head is connected to the phase signal processing means.

7. The apparatus of claim 6, wherein, in response to another head switching signal, a video signal is inputted to the second video head while substantially simultaneously the first video head is connected to the phase signal processing means.

* * * * *